United States Patent [19]
Shimizu

[11] 4,206,265
[45] Jun. 3, 1980

[54] COATED METALLIC ARTICLE HAVING A MULTILAYER PAINT FILM

[75] Inventor: Hiromichi Shimizu, Sagamihara, Japan

[73] Assignee: Daiwa Can Company, Limited, Nihombashi, Japan

[21] Appl. No.: 946,803

[22] Filed: Sep. 28, 1978

[30] Foreign Application Priority Data

Oct. 7, 1977 [JP] Japan ................................ 52/120783

[51] Int. Cl.[2] ................................ B32B 15/08
[52] U.S. Cl. ................................ 428/472; 428/539
[58] Field of Search .................... 427/407 R, 408, 409, 427/410; 428/212, 219, 469, 539, 472

[56] References Cited

U.S. PATENT DOCUMENTS

| | | | |
|---|---|---|---|
| 3,479,197 | 11/1969 | Mork | 427/408 X |
| 3,642,530 | 2/1972 | Webb | 427/410 X |

*Primary Examiner*—Evan K. Lawrence
*Attorney, Agent, or Firm*—Watson, Leavenworth, Kelton & Taggart

[57] ABSTRACT

A coated metallic article has a paint film formed by applying pigment-containing synthetic resin paints to the substrate and baking or curing the coating. The paint film is made of two or three layers of paint compositions consisting of a synthetic resin in common containing a pigment in common but in different proportions.

6 Claims, No Drawings

COATED METALLIC ARTICLE HAVING A MULTILAYER PAINT FILM

BACKGROUND OF THE INVENTION

This invention relates to a coated metallic article having a paint film formed by applying pigment-containing synthetic resin paints to the substrate and baking or curing the coating. More particularly, the invention is concerned with a coated article having two or three layers of paints different in pigment contents, and which takes the form of either a container for canning a drink, fruit, vegetable, or other food or a coated metallic sheet for fabrication into containers for general purposes.

Containers themselves or metallic sheets to be worked into containers are usually decorated by giving an under-coat of a paint containing a white pigment to the metallic substrate, printing the under-coat layer with ink of a desired color, and then finishing the printed surface with a top-coat of a protective varnish. The multilayer paint films formed by superposition of single layers of coating materials different in color and-/or dissimilar in kind are well-known.

The term "single layer" as used herein means a layer formed by not only one coat but two or more coats of a paint, consisting of a synthetic resin as the vehicle solid and a given proportion of a pigment contained, and which looks homogeneous throughout as a single layer when cut crosswise and visually observed.

The decorative paint films on those metallic sheets are required to exhibit the desired degrees of saturation and lightness of color. For example, in case of the paint film that contains the white pigment and is often used as the under-coat, a paint prepared by mixing a white pigment in the maximum proportion permissible from the viewpoint of coating operation or of the resulting film with a synthetic resin as the vehicle solid of the paint is applied heavily in a thick layer where a high degree of lightness is required or lightly in a thin layer where lightness may be low, thus forming an under-coat layer of a desired lightness.

SUMMARY OF THE INVENTION

It is, therefore, an object of the present invention to provide a coated metallic article having a multilayer paint film whose overall thickness is reduced, without sacrificing its desirable lightness, to a value less than the thickness of an ordinary single-layer film exhibiting desirable lightness.

Another object of the invention is to make a white paint film, which is in wide use as the under-coat for containers, thinner than the ordinary single-layer film without causing any undersirable difference of its lightness from that of the single-layer film, thereby contributing to the economy in consumption of the synthetic resin paint and titanium dioxide.

In accordance with the invention, a coated metallic article is provided which has a multilayer paint film formed by giving a first coat of a paint to the surface of the article to be decoratively finished, giving a second coat or second and third coats thereon, and then drying and baking or curing those coats together, characterized in that the first and second coat layers or the first to third layer consist of an identical synthetic resin containing a pigment in common but in varied proportions per unit quantity of the synthetic resin, and that the thickness of the multilayer paint film is less than that which the first, second, or third coat layer alone would have to attain if it were to exhibit the same lightness as the multilayer film.

DETAILED DESCRIPTION OF THE INVENTION

This invention is concerned with a coated metallic article having a multilayer paint film formed by applying a plurality of pigment-containing paints in multiple coats to the substrate and then drying and baking or curing the coats together, and more specifically to such a coated article having the multilayer paint film which uses paints in a smaller amount than the amount a single-layer film would need, or which is thinner than the single-layer film but is substantially comparable in lightness to the latter.

An example of the ordinary practice will be given below for comparison with an embodiment of the invention which is to be described later.

A thermosetting acrylic resin and titanium dioxide as a white pigment were mixed at a ratio by weight of 1:1.5. To 65 parts of this mixture was added 35 parts of a solvent to prepare a water paint, and the paint was applied to the outer surface of a cylindrical body of tinned sheet-iron about 53 mm in diameter, at a rate of 220 mg per 1 $dm^2$, and then the coating was dried and baked. The lightness value of the single-layer paint film on the cylindrical body as determined by means of a color difference meter was 92. For the purposes of the invention the lightness value of 100 means that the paint film is pure white and zero means that the film is deep black. The value of 92 was obtained when the lightness of the outer surface of the cylindrical body was determined. When the cylinder was unrolled flat, the value was about 82.

Now an embodiment of the invention which exhibited the same lightness as the conventionally coated object will be described.

As the first coat paint, the above-mentioned water paint was applied to the outer surface of a tinned sheet-iron cylindrical body of the same size as used in the preceding example at a rate of 88 mg per 1 $dm^2$. Next, a water paint, prepared by adding 40 parts of a solvent to 60 parts of a mixture consisting of the thermosetting acrylic resin and titanium dioxide mixed at a ratio by weight of 1:1.2, was applied as the second coat paint at a rate of 88 mg per 1 $dm^2$. The multilayer coating was then dried and baked under the same conditions as in the afore-described example.

After the baking, the lightness of the multilayer paint film on the outer surface of the cylindrical body was determined by a color difference meter to be about 92.

This embodiment shows that the sum of the thicknesses of the first and second coats, or the thickness of the multilayer paint film, is about 85% of the thickness of the single-layer film formed in the conventional way, saving 20% of the paint ordinarily required.

While in the embodiment above described the same amounts of paints were applied to form the first and second coat layers, the amounts were varied in other embodiments. For instance, the same first and second coat paints as used in the above embodiment were employed, and the first coat paint was applied at a rate of 110 mg/$dm^2$ and the second coat paint at a rate of 60 mg/$dm^2$. In another embodiment, the amount of the first coat paint applied was 66 mg/$dm^2$ and that of the second coat paint was 119 mg/$dm^2$. The thicknesses of the multilayer paint films formed in these two embodiments were about 81% and about 92%, respectively, of the thickness of the conventional film. Nevertheless, the both films on the outer surfaces of cylinders provided lightness values close to 92.

Still another embodiment will be described below.

A cylindrical body of the same size as that used in the reference example was employed as an article to be coated. The same water paint as prepared in the example was applied as the first coat paint to the object at a rate of 110 mg/dm$^2$. To the first coat layer made was applied as the second coat paint a water paint, prepared by adding 40 parts of a solvent to 60 parts of a mixture consisting of the thermosetting resin and titanium dioxide mixed at a ratio by weight of 1:0.8, at a rate of 73 mg/dm$^2$, and the two coats were dried and baked together. Despite an approximately 3% reduction in thickness from the reference example, this multilayer paint film produced a lightness value of about 92.

In the embodiments of the invention so far described the second coat paint used always had a smaller content of the pigment than the first. It has been confirmed that this may be reversed and a multilayer paint film having a second coat with a greater pigment content than the underlying coat can maintain a lightness equal to that of an ordinary single-layer paint film and can nevertheless be made thinner than the latter.

The embodiments of the invention having multilayer paint films of two-coat or double-layer structure have been described. Experiments have indicated that, with a double-layer film, a lightness value of 94, for example, is attained by applying a total of from 205 to 225 milligrams of paints per decimeter square of the surface, as of a can body, whereas about 260 mg/dm$^2$ of a paint is required in case of a single-layer film. For a triple-layer film consisting of first to third coats of paints of the same synthetic resin containing the same pigment in different proportions, the amount of the paint used is from 190 to 220 mg/dm$^2$. Thus, the triple-layer paint film may need a smaller total quantity of paints than the double- and, of course, single-layer films. In case of a quadruple-layer film, however, the quantity of the paint applied per coat is so small that unevenness in application tends to occur and uniform lightness throughout the film on the entire outer surface of the can body is difficult to achieve.

Each paint for each coat or layer of the multilayer film according to this invention may be applied in a predetermined quantity to the outer surface of a can body either during a revolution of the can body or continuously while the object makes two or three turns. Also, the second coat paint may be applied either after the first paint has dried or when the underlying coat is still wet or half dry.

As the coating apparatus for use in practice of the invention, various coating and printing machines known in the art may be employed. Where the top coat paint is applied while the under-coat is not dry yet, a single coating or printing machine may be used, with application rolls arranged at two or three points along the conveying line of the objects, so that each object can be given, in succession, the first and second coats, or the first to third coats, as the case may be. The coated objects are then transferred to a drying and baking unit. In this way the equipment is simplified and reduced in size.

Also, while the embodiments have been described in connection with paints using titanium dioxide alone, the invention is equally applicable to paints containing a light colorant or the like in addition to that pigment.

One of the features of this invention is the fact that, while the first and second, or the first to third, coat layers are films of paints of the same synthetic resin containing the pigment in common, the pigment contents of the paints per unit quantity of the synthetic resin vary. It is apparently for this reason that a distinct interface or interfaces, formed between the first and second, or the first, second, and third, coat layers, cause critical reflection of incident rays and enable the multilayer paint film which is thinner, as a whole, to exhibit the same degree of lightness as a single-layer coating which is free of interface.

It will be apparent that various changes in form and details can be made to the article of the invention without departing from the spirit and scope thereof, the forms hereinbefore described being merely preferred embodiments thereof.

What is claimed is:

1. A coated metallic article having a multilayer paint film having a desired degree of lightness of color, said film comprising a first coat layer and a second coat layer formed thereon in superposition, each said layer consisting of a common synthetic resin and a common white pigment material, the pigment material content in each layer being in different proportions, the thickness of said multilayer paint film being less than the thickness of at least one layer of said film exhibiting the same lightness of color as said multilayer film.

2. A coated metallic article in accordance with claim 1 in which said pigment material is titanium dioxide.

3. A coated metallic article in accordance with claim 1, wherein the pigment material content in said second coat layer is less than the pigment material content in said first coat layer.

4. A coated metallic article in accordance with claim 1, wherein the pigment material content in said first coat layer is less than the pigment material content in said second coat layer.

5. A coated metallic article in accordance with claim 1 in which said second coat layer has an additional or third coat layer thereon consisting of said common synthetic resin and said common white pigment material, the pigment material content in said third layer being different than that in said first and second layers.

6. A coated metallic article in accordance with claim 5, wherein the thickness of said three layer film is less than the thickness of two layers of said film exhibiting the same lightness of color.

* * * * *